United States Patent [19]

Tribbett

[11] Patent Number: 4,570,298
[45] Date of Patent: Feb. 18, 1986

[54] DUAL EXTRUSION APPARATUS

[75] Inventor: Kenneth E. Tribbett, Austin, Minn.

[73] Assignee: Geo. A. Hormel & Co., Austin, Minn.

[21] Appl. No.: 679,027

[22] Filed: Dec. 6, 1984

[51] Int. Cl.[4] ............................................. A22C 11/02
[52] U.S. Cl. ......................................... 17/41; 17/1 F; 17/33; 425/133.1
[58] Field of Search ................. 425/133.1; 17/1 F, 33, 17/41

[56] References Cited

U.S. PATENT DOCUMENTS

| | | | |
|---|---|---|---|
| 1,759,928 | 5/1930 | Allen | 425/133.1 |
| 3,115,668 | 12/1963 | Townsend | 17/33 |
| 3,191,222 | 6/1965 | Townsend | 17/33 |
| 3,241,503 | 3/1966 | Schafer | 425/133.1 X |
| 3,672,001 | 6/1972 | Greider | 17/33 |
| 4,023,238 | 5/1977 | Phares | 17/41 |
| 4,136,447 | 1/1979 | Gillbans | 17/1 F X |
| 4,187,583 | 2/1980 | Townsend et al. | 17/1 F X |
| 4,501,542 | 2/1985 | Nausedas | 17/33 X |
| 4,505,003 | 3/1985 | Becker et al. | 17/41 |

Primary Examiner—J. Howard Flint, Jr.
Attorney, Agent, or Firm—Herman H. Bains

[57] ABSTRACT

A frank making apparatus for extruding a frank having a hollow interior filled with a condiment, such as chili, cheese, taco sauce or the like, includes a reciprocating stuffing horn assembly. The stuffing horn assembly includes concentrically arranged inner and outer stuffing tubes which are secured together and which reciprocate between advanced and retracted positions. The outer stuffing tube, when in the advanced position, is disposed in communicating relation with a metering pump connected to a source of sausage material so that the sausage material is extruded from a cylindrical chamber located between the inner and outer stuffing tubes. The inner stuffing tube, when in the advanced position, is disposed in communicating relation with a second metering pump which is connected to a source of flowable condiment, which is extruded from the inner stuffing tube into the outer core of the frank so that the latter has the texture, color and flavor of a conventional frank, while containing a core of cheese, taco sauce, relish or the like.

6 Claims, 4 Drawing Figures

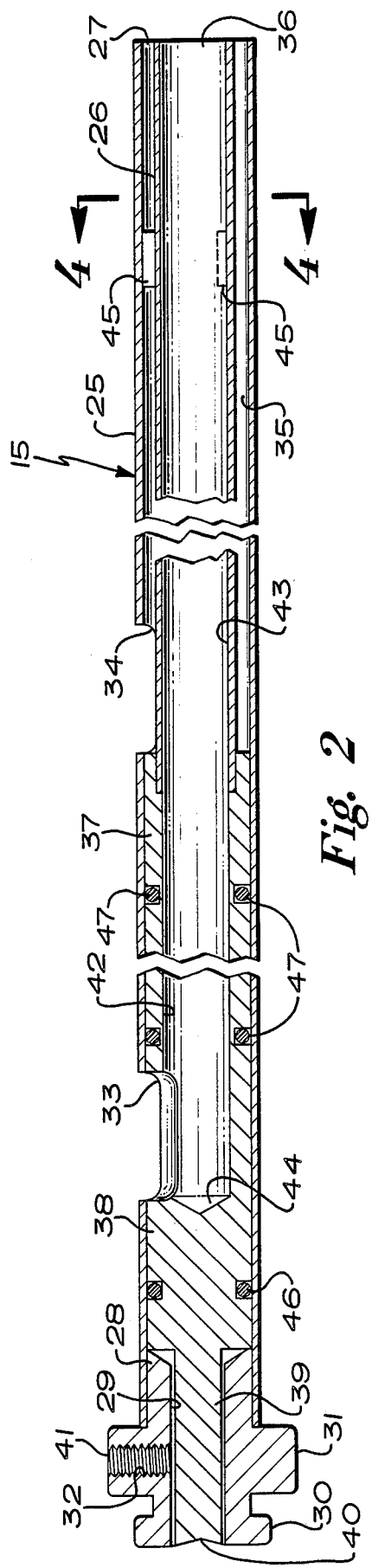
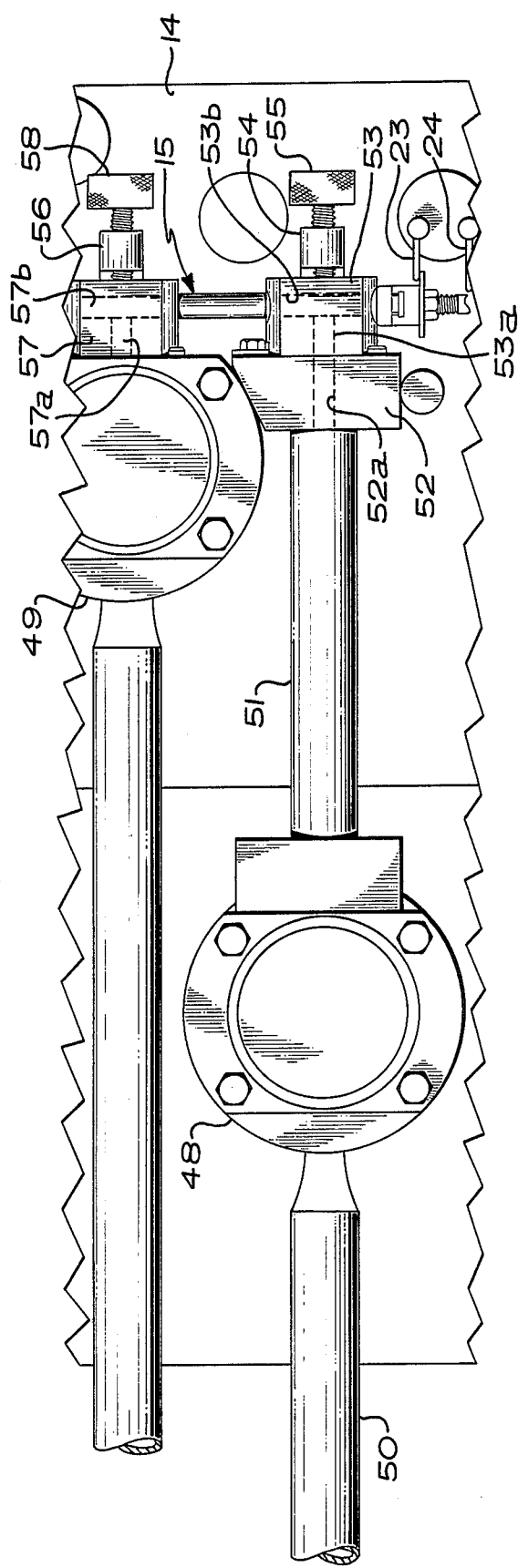
Fig. 2
Fig. 3

DUAL EXTRUSION APPARATUS

This invention relates to an apparatus for forming a sausage product having a core of chili, cheese or the like.

SUMMARY OF THE INVENTION

Sausage products, such as weiners, are usually formed in an extrusion type operation wherein the sausage emulsion is stuffed into a casing and thereafter cooked. Attempts have been made to form a weiner having a core filled with condiments, such as relish, cheese or the like, but such attempts have not produced a completely satisfactory product. Presently, there are cheese franks on the market, but the cheese is mixed with the meat, and this mixing effect gives the product a different texture, color, and flavor from that of the conventional frank.

It is therefore a general object of this invention to provide a novel and improved apparatus for forming a weiner type sausage product having a clearly defined core filled with cheese, taco sauce, relish or the like.

A more specific object of this invention is to provide a novel apparatus including a unique stuffing horn comprising inner and outer stuffing tubes arranged and constructed to extrude a weiner type sausage product into a casing where the weiner has a clearly defined core containing cheese, taco sauce, relish or a similar type condiment.

Another object of this invention is the provision of a dual extrusion stuffing horn which may be incorporated in a frank making machine which is operable to make a frank having a clearly defined inner cavity that is filled with a condiment, such as cheese, chili or the like. These and other objects of the invention are more fully defined in the following specification.

DESCRIPTION OF THE DRAWING

FIG. 2 is a cross sectional view of the dual extrusion stuffing horn illustrating the details of construction thereof;

FIG. 3 is a fragmentary plan view of the apparatus illustrated in FIG. 1 and showing certain components of the present invention.

DESCRIPTION OF THE PREFERRED EMBODIMENT

Figures 1, 4:
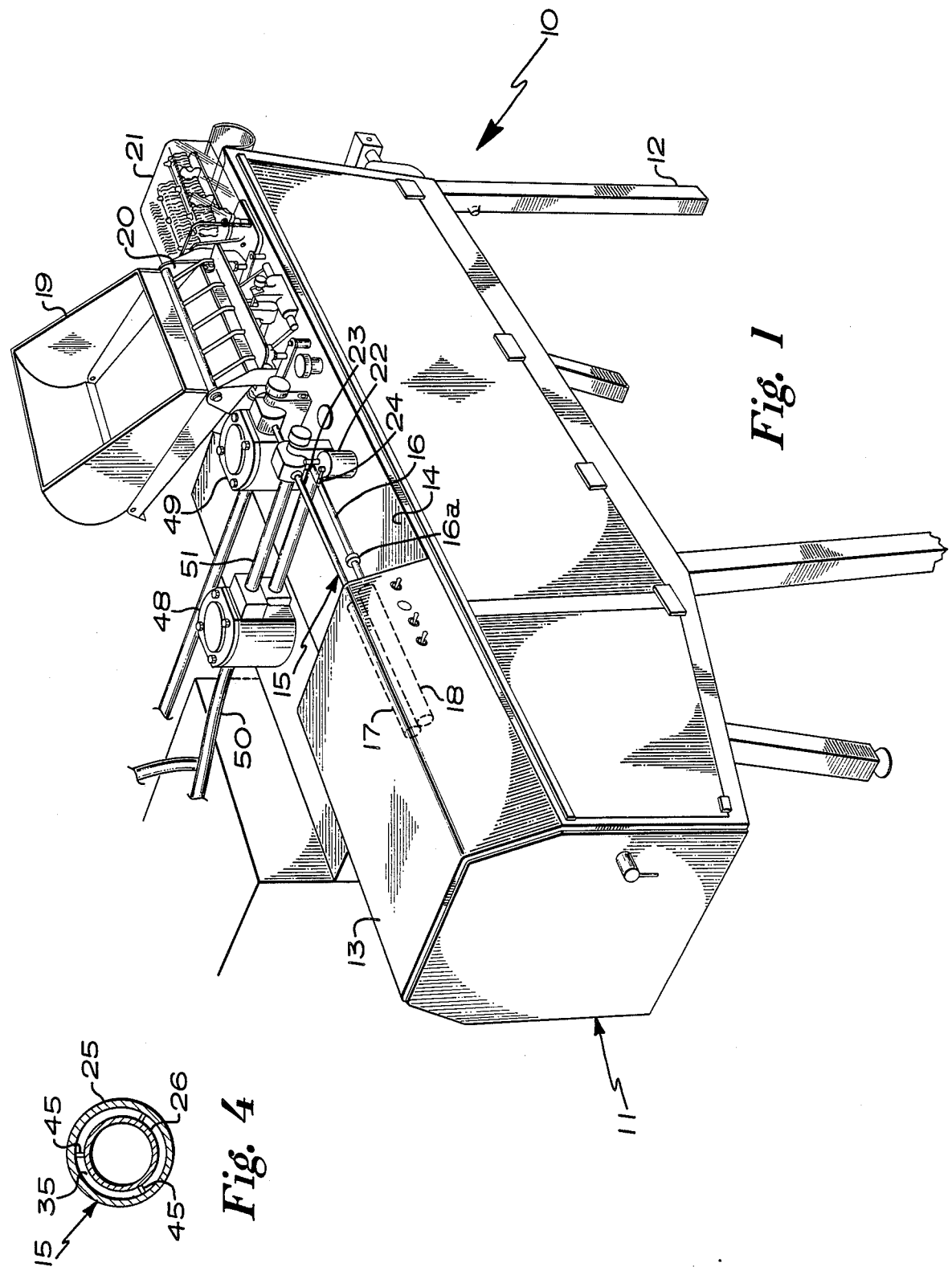
FIG. 1 is a perspective view of a conventional frank making machine incorporating the novel dual extrusion stuffing horn.
FIG. 4 is a cross sectional view taken along the line 4—4 of FIG. 2 and looking in the direction of the arrows.

Referring now to the drawings and more specifically to FIG. 1, it will be seen that a conventional commercial machine, designated generally by the reference numeral 10, for making a weiner type sausage product is thereshown. The particular machine shown may be a conventional Frank-A-Matic Model DB-3 machine manufactured by Townsend Engineering Company and includes a housing 11 provided with supporting legs 12. The housing 11 has a housing extension 13 adjacent the rear end thereof and the housing includes a top wall 14. The machine is adapted to stuff, link and hang franks in a continuous operation.

In this regard, the machine incorporates the novel stuffing horn assembly 15 which is movable between advanced and retracted positions during the stuffing operation. A follower rod 16 is provided and is similarly movable in advanced and retracted directions. An air cylinder unit 17 shifts the stuffing horn assembly between the advanced and retracted positions, while an air cylinder 18 shifts the follower rod 16 in between advanced and retracted positions. The apparatus 10 also includes a casing hopper 19 for containing a predetermined number of shirred casings and casing feed mechanism 20. A linker mechanism 21 is mounted on the top wall 14 adjacent the front end of the apparatus 10 and serves to form the stuffed casings into links of predetermined length in a well-known manner. Although not shown in the drawings, a take-away conveyor is also provided and the link sausages are hung from the conveyor support hook for continuously moving the links to a remote station.

The apparatus 10 also includes a switch housing 22 mounted on the top wall 14 and the switch housing has a switch arm 23 and a switch arm 24, the purpose of which will be more fully described hereinbelow. With the exception of the stuffing horn assembly 15, the aforementioned components of the apparatus 10 are embodied in a commercial apparatus and, per se, do not form a part of the present invention.

The stuffing horn assembly 15 includes an outer stuffing tube 25 and an inner stuffing tube 26 positioned within the outer stuffing tube and spaced concentrically therefrom. The outer stuffing tube 25 is provided with an open front end 27 which defines the outlet for the outer stuffing tube. The outer stuffing tube 25 is also provided with a cylindrically shaped coupling member 28 secured to its rear end and projecting therefrom. Coupling member 28 has an axial opening 29 therethrough which opens rearwardly. Coupling member 28 also includes a rear flange 30 which extends radially outwardly therefrom and an intermediate flange 31 which is spaced forwardly of the rear coupling flange. It will be noted that the radial dimension of the intermediate flange 31 is greater than the radial dimension of the rear coupling flange 30. The intermediate flange 31 has a threaded opening 32 therein that extends radially inwardly and communicates with the opening 29 in the coupling member 28. The piston rod of the air cylinder 17 is connected to the rear coupling flange 30.

The outer stuffing tube 25 has an opening 33 therein which is located intermediate the ends thereof. The outer coupling tube 25 also has an opening 34 therein which is located forwardly of the opening 33 and which communicates with the cylindrical extrusion chamber 35 defined between the outer stuffing tube 25 and the inner stuffing tube 26. Sausage emulsion is introduced through the opening 34 into the extrusion chamber 35 during the sausage making operation.

The inner stuffing tube 26 has an open front end 36 which is disposed in the same transverse plane as the opening 37, as best seen in FIG. 2. The open front end 36 also defines the outlet for the inner stuffing tube 26. The inner stuffing tube 26 includes an elongate rear coupling member 37 which is of generally cylindrical configuration and which has a closed rear end 38. The closed rear end 38 has an elongate rearwardly projecting coupling stem 39 extending rearwardly therefrom which projects through the opening 29 in the coupling member 28. The rear end surface of the coupling stem 39 is of concave configuration, 40 as best seen in FIG. 2. The set screw 41 threadedly engages the threaded recess 32 and engages the coupling stem 39 to releasably lock the outer stuffing tube to the inner stuffing tube.

Referring again to FIG. 2, it will be seen that the inner surface of the coupling member 32 is coextensive with the inner surface 43 of the tube portion of the inner stuffing tube. It will also be noted that the closed rear end 38 of the coupling member 37 presents a concave forwardly facing surface 44. Referring now to FIGS. 2 and 4, it will be seen that a plurality of circumferentially spaced apart radially extended spacer elements 45 extend between and engage the outer surface of the inner stuffing tube and the inner surface of the outer stuffing tube to thereby maintain the inner and outer stuffing tubes in radially spaced relation.

The closed rear end portion 38 of the coupling member 37 has an annular groove therein which accommodates an O-ring seal 46 that seals against the interior of the outer stuffing tube 25. The coupling member 37 is also provided with a pair of annular grooves therein which are axially spaced apart and each accommodating an O-ring seal 47 therein. It will be noted that the seals 47 engage the inner surface of the outer stuffing tube to form a seal thereat.

Referring now to FIGS. 1 and 3, it will be seen that a metering pump 48 and a metering pump 49 are each mounted on the top wall 14 of the housing 11. The metering pump 48 is connected by an inlet conduit or line 50 to a source of flowable core material, such as cheese, chili, taco sauce, relish or a similar condiment. Similarly, the metering pump 49 is connected by an inlet conduit or line 50a to a source of flowable sausage emulsion. In this regard, the metering pump 49 corresponds to the metering pump for the Frank-A-Matic apparatus 10. The metering pump 48 has an outlet which is connected in communicating relation to a stuffing tube block 53 mounted on a support 52. The stuffing tube block 53 is provided with a clamping arm 54 which has a threaded opening therethrough for accommodating a clamping screw 55. The stuffing tube block 53 is clamped against the support 52, the latter having an opening 52a therein that is disposed in communicating relation with the extension conduit 51. The stuffing tube block 53 has an opening 53a therein which is disposed in registering communicating relation with the opening 52a in the support. The stuffing tube block 53 also has an opening 53b therethrough which communicates with the opening 53a and which accommodates the stuffing horn assembly 15 therethrough.

The metering pump 59 is provided with a clamping arm 56 having a threaded opening therethrough for accommodating a clamping screw 58 which clamps the stuffing tube block 57 against the outlet of the metering pump 49. The stuffing tube block 57 has an opening 57a therein which communicates with the outlet of the metering pump and also communicates with an opening 57b through the stuffing tube block, as best seen in FIG. 3. The opening 57b through the stuffing tube block 57 accommodates the stuffing horn assembly 15 therein.

The follower rod 16 has a cam follower 16a secured thereto and also has an annular element (not shown) secured thereto and extending around the stuffing horn assembly 15. During operation of the apparatus, the master switch will be closed and the air cylinders 17 and 18 will be actuated to advance the stuffing horn assembly and the follower rod 17 to the advanced position. The annular member on the follower rod will move with the stuffing horn assembly and will engage the rear end of the casing to be filled. The forward end of the stuffing horn assembly will move into the interior of the shirred casing to be stuffed, and this movement will continue until the flange 31 engages the switch arm 23. This will deactivate the air cylinder 17 and will cause the metering pumps 48 and 49 to be operated. Sausage material will be discharged through the outlet of the metering pump 49 into the inlet 34 and into the extrusion chamber 35, and will be extruded through the open end 27 of the extrusion chamber 35 into the casing.

Simultaneously, the metering pump 48 will discharge the flowable core material, such as cheese, taco sauce, chili, relish or the like, into the stuffing tube block 53 and into the inlet 33 for the inner stuffing tube 26. The flowable core material will be discharged through the outlet 36 simultaneously during extrusion of the sausage material from the extrusion chamber 35. The dual extrusion from the stuffing horn assembly 15 continues until the follower 16a on the follower rod 16 strikes the switch arm 24. This occurs when a casing is substantially filled during the extrusion cycle. When this occurs, the metering pumps 48 and 49 will be simultaneously de-energized and the air cylinders 17 and 18 will be actuated to retract the stuffing horn assembly and the follower rod 18. The casing feed mechanism will feed the next casing to be filled into position and the linking mechanism will form the stuffing casing into links during this operation. This cycle will begin anew when the flange 31 engages an actuating switch (not shown) to again cause extension of the air cylinders 17 and 18.

It will be seen that by extruding the sausage and core material under high pressure simultaneously from the discharge end of the stuffing horn assembly, a well-defined inner core will be formed within the frank or weiner and will not be mixed in any appreciable amount with the sausage material. Therefore, the weiner or frank will have a texture, appearance, and flavor of a conventional frank, but will have a hollow interior completely filled with the selected condiment.

From the foregoing, it will be seen that we have provided a novel dual extrusion stuffing horn assembly for a frank forming machine which is operable to form a conventionally appearing and tasting frank having a core filled with a suitable condiment, such as chili, taco sauce, cheese, and the like.

What is claimed is:

1. In a frank making apparatus for producing a frank in which the apparatus includes a support structure, a metering pump connected to the source of flowable sausage material having an outlet through which the sausage material is discharged, a casing hopper and feed mechanism for sequentially feeding the casing into a position to be stuffed, a linking mechanism for forming the stuffed casing into links, comprising:

a second metering pump connected to a source of flowable core material, such as chili, cheese or the like, having an outlet through which the flowable core material is discharged, a reciprocating stuffing horn assembly mounted on the support structure for reciprocating movement relative thereto between an advanced position and a retracted position, said stuffing horn assembly including an elongate cylindrical outer stuffing tube having an open forward end defining a discharge outlet, said outer stuffing tube having an inlet opening therein intermediate the ends thereof, an elongate generally cylindrically shaped inner stuffing tube positioned concentrically within said outer stuffing tube and being spaced radially inwardly therefrom to define a cylindrical chamber between the inner and outer stuffing tubes, the front end of said inner stuffing tube being open and being disposed in the same transverse plane as the front end of the outer stuffing tube, the open front end of said inner tube defining a discharge outlet, the interior of said inner stuffing tube being of uniform circular cross sectional configuration, said inner stuffing tube having an inlet therein intermediate the ends thereof and spaced rearwardly of the inlet opening of said outer tube, said outer tube including a coupling member adjacent the rear end portion thereof having an axial opening therethrough, said inner tube including a coupling member at its rear end portion having a stem projecting rearwardly therefrom and projecting through the opening in the coupling member of said outer stuffing tube and being connected to the latter, means for shifting said stuffing horn assembly between advanced and retracted positions, said stuffing horn assembly when in the advanced position having the front end thereof projecting into a casing and having the inlet of said inner stuffing tube disposed in communicating relation with the second metering pump and having the inlet of the outer stuffing tube disposed in communicating relation with the first metering pump, where the casing will be stuffed with an inner core of flowable core material, such as chili, cheese or the like, and an outer cylindrical layer of sausage material.

2. In a frank making apparatus including a support structure, a metering pump connected to a source of flowable sausage material and having an outlet through which the sausage material is discharged, a casing hopper and feed mechanism for sequentially feeding a casing into position to be stuffed, a linking mechanism for forming the stuffed casing into links, a switch mechanism for controlling operation of said apparatus, comprising:

a second metering pump connected to a source of flowable core material, such as chili, cheese or the like, and having an outlet through which the flowable core material is discharged, a reciprocating stuffing horn assembly mounted on the support structure for reciprocating movement relative thereto between advanced and retracted positions, said stuffing horn assembly including an elongate cylindrical outer stuffing tube including an elongate cylindrical outer tubular element extending in a fore and aft direction and an outer coupling element secured to the rear end of the tubular element and projecting rearwardly therefrom, said outer stuffing tube having an open forward end defining a discharge outlet and having an inlet opening in the outer tubular element intermediate the ends thereof, an elongate generally cylindrically shaped inner stuffing tube positioned concentrically within said outer stuffing tube and including an inner tubular element and an inner coupling element secured to the rear end portion of said inner tubular element and projecting rearwardly therefrom, said inner tubular element being spaced radially inwardly from the outer tubular element and defining a cylindrical chamber therebetween, the front end of said inner tubular element being open and being disposed in the same transverse plane as the front end of the outer tubular element and defining a discharge outlet, said inner coupling element being of cylindrical configuration and having an inlet opening therein disposed in registering relation with an opening in the outer tubular element, said inner coupling element being secured to the outer coupling element to secure the inner and outer stuffing tubes together, means for shifting said stuffing horn assembly between advanced and retracted positions, said stuffing horn assembly when in the advanced position having the front end thereof projecting into a casing and having the inlet of said inner stuffing tube disposed in communicating relation with the second metering pump and having the inlet of the outer stuffing tube disposed in communicating relation with the first metering pump whereby the casing will be stuffed with an inner core of flowable material, such as chili, cheese or the like, and an outer cylindrical layer of sausage material.

3. The apparatus as defined in claim 2 wherein said outer coupling element has an axial opening therethrough, said inner coupling element having an elongate stem projecting rearwardly therefrom and through said opening in said outer coupling element, and means on said outer coupling element engaging said stem to secure said inner and outer stuffing tubes together.

4. The apparatus as defined in claim 2 wherein said outer coupling element has a pair of flanges thereon projecting outwardly therefrom, one of said flanges engaging said switch mechanism when said stuffing horn assembly is moved in an advanced direction to stop further movement of said stuffing horn assembly.

5. The apparatus as defined in claim 2 wherein said inlet for said cylindrical chamber between said inner and outer tubular elements is located forwardly of said inner coupling element.

6. The apparatus as defined in claim 2 wherein said inlet for said inner stuffing tube is located intermediate the ends of said stuffing horn assembly.

* * * * *